United States Patent
Rim

[11] Patent Number: 5,905,665
[45] Date of Patent: May 18, 1999

[54] MODULO ADDRESS GENERATING CIRCUIT AND METHOD WITH REDUCED AREA AND DELAY USING LOW SPEED ADDERS

[75] Inventor: Min-Joong Rim, Yongin, Rep. of Korea

[73] Assignee: Samsung Electronics, Co., Ltd., Suwon, Rep. of Korea

[21] Appl. No.: 08/906,273

[22] Filed: Aug. 5, 1997

[30] Foreign Application Priority Data

Jan. 10, 1997 [KR] Rep. of Korea .......................... 97-420

[51] Int. Cl.$^6$ .............................. G06F 7/38; G06F 7/50
[52] U.S. Cl. ........................................... 364/746; 364/769
[58] Field of Search ................................. 364/746, 768, 364/769, 715.06; 340/146.2

[56] References Cited

U.S. PATENT DOCUMENTS

| | | | |
|---|---|---|---|
| 4,800,524 | 1/1989 | Roesgen ................................... | 711/217 |
| 4,833,602 | 5/1989 | Levy et al. ............................... | 746/364 |
| 5,249,148 | 9/1993 | Catherwood et al. .................... | 746/364 |
| 5,276,827 | 1/1994 | Delaruelle et al. ....................... | 711/217 |
| 5,511,017 | 4/1996 | Cohen et al. ............................. | 364/746 |
| 5,659,700 | 8/1997 | Chen et al. ............................... | 711/217 |

*Primary Examiner*—Tan V. Mai
*Attorney, Agent, or Firm*—Marger Johnson McCollom, P.C.

[57] ABSTRACT

A modulo address generating apparatus and method are disclosed which obtain high speed performance with reduced integrated circuit area. A modulo address generator according to the present invention includes a first adder for adding a current address to an address increment to generate an incremented address, an inverter for producing a complement of a maximum address, a second adder for generating a circular correction value by adding the complement of the maximum address to a minimum address, an adder/subtracter for generating a corrected next address by adding or subtracting the circular correction value to or from the incremented address according to a sign value of the address increment, a comparator for checking whether the incremented address is within an address range defined by the maximum and minimum addresses, and a multiplexor controlled by the comparator which selects the incremented address for output as a next address when the incremented address is within the address range and selects the corrected address for output as the next address when the incremented address is outside the address range.

4 Claims, 2 Drawing Sheets

MODULO ADDRESS GENERATING CIRCUIT AND METHOD WITH REDUCED AREA AND DELAY USING LOW SPEED ADDERS

BACKGROUND OF THE INVENTION

1. Field of the Invention

The present invention relates to a modulo address generating apparatus and method which obtains performance speed suitable for high-speed digital signal processing with reduced integrated circuit area by performing additions in parallel using low speed adders.

2. Description of the Prior Art

Generally, modulo addressing is used in digital signal processors (DSPs) to efficiently perform a DSP algorithm, such as a digital filter.

Modulo addressing is, in essence, a circular addressing method. The simplest type of modulo addressing returns to a base address (B) when reaching a predetermined maximum address (M) by incrementing a current address (A) by a predetermined address increment (I). The same data region is therefor repeatedly accessed. Modulo addressing can thus be implemented in a DSP algorithm to repeatedly access data that is located in a specific region, such as filter coefficient data, with high speed and a low level of address generation overhead. The address increment I can be either positive, for incrementing the address A, or negative, to decrement the address A.

In more general terms, given that a predetermined data region is defined by the maximum address M and the minimum address B, the modulo algorithm for the next address NEXT_A can be expressed as described below.

First, when $I \geq 0$ and $A+I \leq M$, then the next address NEXT_A is expressed by NEXT_A=A+I. Conversely, if $I \geq 0$ and $A+I>M$, then the next address NEXT_A is expressed as follows:

$$\text{NEXT\_A} = A+I-(M-B+1) \quad (1)$$

where $M \geq A \geq B$ and $I<M-B+1$.

Similarly, when $I<0$ and $A+I \geq B$, then the next address $\text{NEXT}_A$ is expressed as NEXT_A=A+I. However, when $I<0$ and $A+I<B$, then the next address NEXT_A is expressed as follows:

$$\text{NEXT\_A} = A+I+(M-B+1) \quad (2)$$

where $M \geq A \geq B$ and $|I|<M-B+1$.

However, the implementation of equations (1) and (2) above typically requires a circuit having multiple stage adders connected in series. This has the disadvantage that the modulo address generation function may become a critical path in a high speed digital signal processor due to the delay introduced by the sequentially operating multi-stage adders. Circuits have been constructed, such as the module addressing circuit 100 shown in FIG. 1, that use high speed adders instead of multiple stage adders in order to avoid the delay introduced by multistage adders.

Modulo addressing circuit 100 consists of a first adder 11 which adds the current address A and the address increment I and outputs a resulting sum signal a. Two multiplexors (MUXs) 12 and 13 are included for selecting and outputting either the maximum address M or the minimum address B according to the sign bit, sign(I), of the address increment I. An inverter INVI inverts the output from the first MUX 12 and inputs the resulting signal b to a second adder 14 which adds the output signal a of the first adder, the output signal b of the inverter and sign(I) to produce an output signal d. A third adder 15 adds the output signal d from the second adder, the output signal c from the second MUX 13 and sign(I) to produce an output signal e. XNOR gate 16 performs an exclusive NOR operation on sign(I) and the sign bit of the output signal d from adder 14, sign(d), to control the selection in MUX 17 of either the output signal a from the first adder or the output signal e from the third adder.

To understand the function of modulo addressing circuit 100, note that when $I \geq 0$ and $A+I>M$, then equation (1) above can be rewritten as follows:

$$\begin{aligned}\text{NEXT\_A} &= A+I-(M-B+1); \quad (3)\\ &= A+I-M+B-1;\\ &= A+I+(inv(M)+1)+B-1;\\ &= A+I+inv(M)+B\end{aligned}$$

In equation (3), inv(M) designates a one's complement of M and $-M=inv(M)+1$, under a two's complement representation. The relation of $A+I>M$ can therefore be expressed as $A+I+inv(M) \geq 0$. Note also that sign(I)=0 for the inputs to adders 14 and 15.

In a similar manner, when $I<0$ and $A+I<B$, equation (2) above can be expressed as follows:

$$\begin{aligned}\text{NEXT\_A} &= A+I+(M-B+1); \quad (4)\\ &= A+I+M+(inv(B)+1)+1.\end{aligned}$$

In equation (4), inv(B) designates a one's complement of B, and the equation $A+I<B$ can be expressed as $A+I+inv(B)<0$.

The algorithm implemented by modulo addressing circuit 100 can then be expressed as follows:

a=A+I;

b=inv(M), when sign(I)=0, or b=inv(B), when sign(I) is 1;

c=B, when sign(I)=0, or c=M, when sign(I)=1;

d=a+b+sign(I);

e=d+c+sign(I);

NEXT_A=a, when sign(I) XNOR sign(d)=0, or

NEXT_A=e, when sign(I) XNOR sign(d)=1  (5).

Modulo addressing circuit 100 can be implemented as described above using only three high speed adders and some additional logic circuitry. The method illustrated in FIG. 1 is used in the D950 core from SGS-Thomson. However, the drawback of the solution illustrated by modulo addressing circuit 100 is the increased chip area required to construct the three high speed adders 11, 14 and 15.

SUMMARY OF THE INVENTION

It is therefore an object of the present invention to provide a modulo address generating circuit and method which is suitable for implementation using low speed adders to reduce chip area required for performing modulo address generation without introducing high levels of circuit delay.

An embodiment of a modulo address generator according to the present invention includes a first adder which adds a current address value and an address increment value to generate an incremented address value, an inverter which generates a complemented maximum address value, and a second adder which adds the complemented maximum address value and a minimum address value of a data region to generate a circular correction value. The present modulo address generator also includes an adder/subtracter which adds the incremented address value and the circular correction value responsive to a positive value of a sign bit of the address increment and subtracts the circular correction value from the incremented address value responsive to a negative value of the sign bit in order to generate a corrected address value. A comparator determines whether the incremented address value is within an address range defined by the maximum and minimum addresses and generates a selection signal having a first logic value when the incremented address value is within the address range and a second logic value when the incremented address value is outside the address range. The selection signal then controls a multiplexor which selects the incremented address value for output as a next address responsive to the first logic value of the selection signal and selects the corrected address value for output as the next address responsive to the second logic value of the selection signal.

An embodiment of the method for modulo address generation according to the present invention includes generating an incremented address value by adding a current address to an address increment, generating a circular correction value by adding a complement of a maximum address of a data region to a minimum address of the data region, generating a corrected address value by subtracting the circular correction value from the incremented address value when a sign bit of the address increment is a first logic level and adding the circular correction value to the incremented address value when the sign bit is a second logic level, comparing the incremented address value to an address range defined by the maximum address and minimum address to generate a selection signal, and selecting the incremented address value as a next address value when the incremented address value is within the address range and selecting the corrected address value as the next address value when the incremented address is outside the address range.

BRIEF DESCRIPTION OF THE DRAWINGS

The above object, and other features and advantages of the present invention will become apparent after a reading of the following detailed description when taken in conjunction with the drawings, in which.

DETAILED DESCRIPTION OF PREFERRED EMBODIMENT

Figure 1:
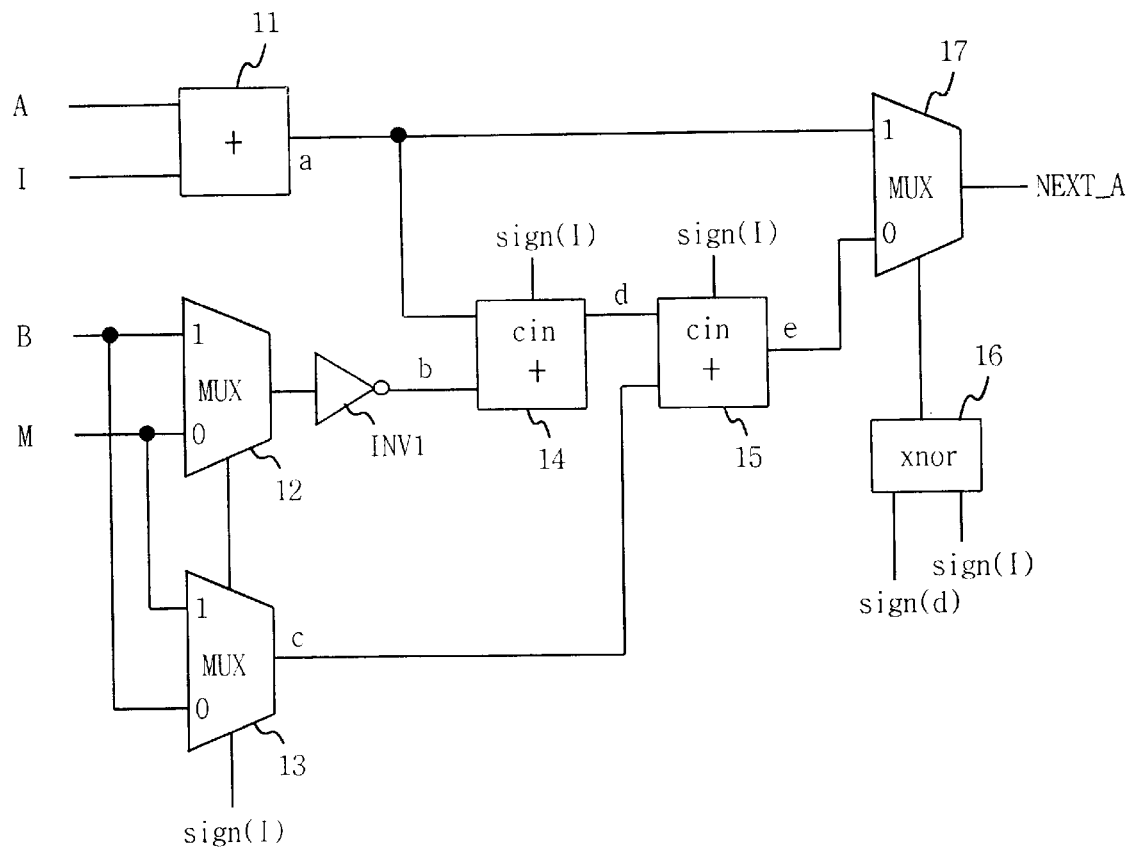
FIG. 1 is a block diagram of a conventional modulo address generator.
Figure 2:
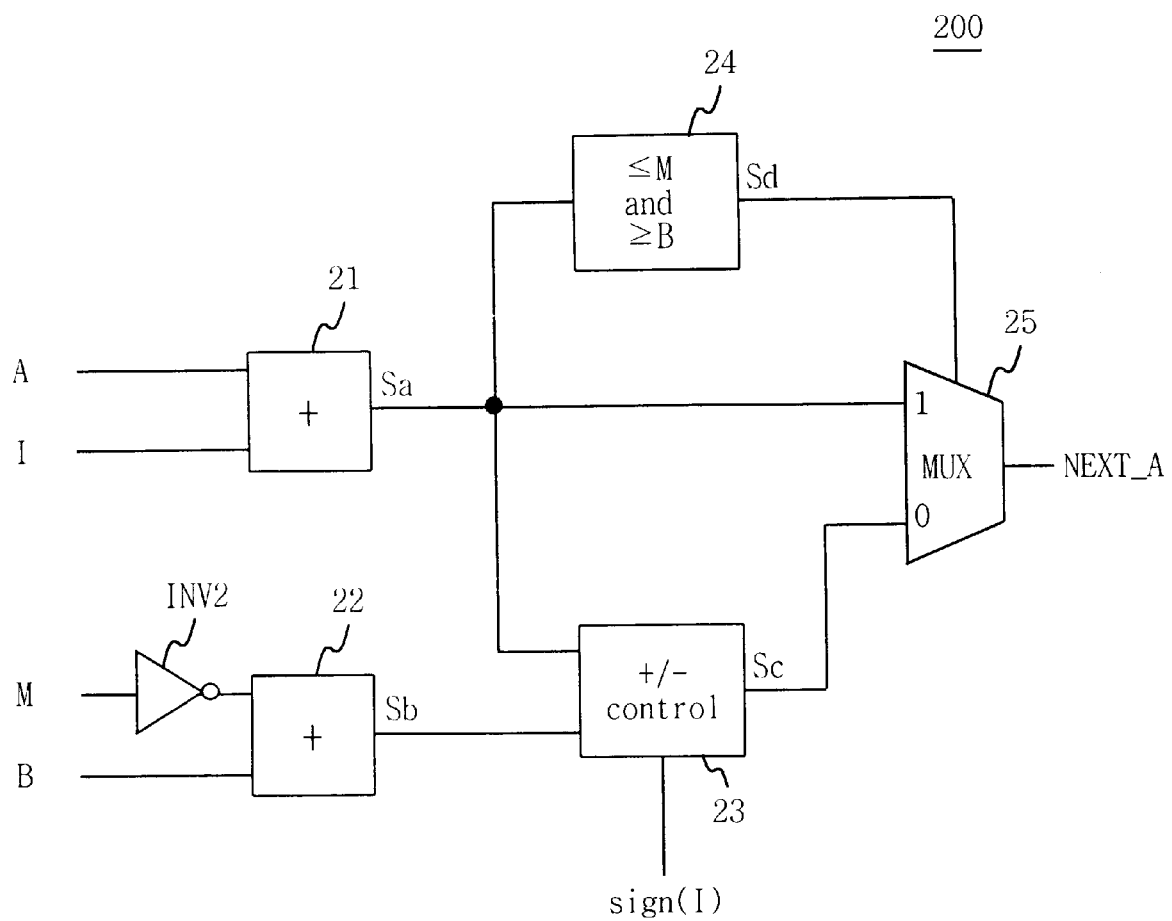
FIG. 2 is a block diagram of an embodiment of a modulo address generator according to the present invention.

An embodiment of a modulo addressing circuit 200 having reduced delay according to the present invention is illustrated in FIG. 2. Modulo addressing circuit 200 includes a first low-speed adder 21 for obtaining an incremented address value Sa by adding the current address A and the address increment I, and a second low-speed adder 22 for generating a circular correction value Sb by adding the one's complement of the maximum address M, inv(M) and the base address B, such that Sb=B+inv(M). An adder/subtracter 23 performs addition of the circular correction value Sb to the incremented address Sa, when sign(I)=0, or subtraction of the circular correction value Sb from the incremented address Sa, when sign(I)=1, in order to produce a corrected address value Sc. A comparator 24 checks whether the incremented address Sa generated by the first adder 21 is within the range of addresses from the base address B to the maximum address M and generates a selection signal Sd, where Sd=1 if the incremented address Sa is within the range and Sd=0 if the incremented address Sa is outside the range. An output multiplexor (MUX) 25 selects either the incremented address Sa from the first adder 21 or the corrected address Sc of the adder/subtracter 23 for output as the next address NEXT_A according to selection signal Sd from comparator 24.

Equation (1) above, where $I \geq 0$ and A+I>M, can be rewritten as follows:

$$NEXT\_A = A + I - (M - B + 1); \quad (6)$$
$$= A + I - M + B - 1;$$
$$= A + I - (B + inv(M)).$$

Similarly, equation (2) above, where I<0 and A+I<B, can be rewritten as follows:

$$NEXT\_A = A + I + (M - B + 1); \quad (7)$$
$$= A + I - B + M + 1;$$
$$= A + I - (B + inv(M)).$$

For all other conditions, the next address NEXT_A is: NEXT_A=A+I.

Equations (6) and (7) above can be expressed in terms of the incremented address value Sa from first adder 21, the circular correction value Sb from second adder 22, the corrected address value Se from adder/subtracter 23, and the selection signal Sd from comparator 24 as follows:

Sa=A+I;

Sb=B+inv(M);

Sc=Sa+Sb, when sign(I)=0, or

Sc=Sa−Sb, when sign(I)=1;

Sd=1, when $B \leq Sa \leq M$, or

Sd=0, when B>Sa and Sa>M;

NEXT_A=Sa, when Sd=1, or

NEXT_A=Sc, when Sd=0 \quad (8)

From equation (8) above, it can be seen that the incremented address value Sa is generated by adding the current address A to the address increment I in first adder 21. The circular correction value Sb is generated by adding the complement of the maximum address, inv(M), to the base address B through the second adder 22. The corrected address Sc is generated by adding or subtracting the circular correction value Sb to or from the incremented address value Sa according to the sign bit of the address increment I, sign(I). The selection signal Sd is generated by the comparator 23 by checking whether the incremented address Sa ranges between the maximum address M and the base address B. If the incremented address Sa is between the maximum address M and the base address B, the incremented address Sa is selected for output as NEXT_A. If the incremented address Sa is not within the range between the maximum address M and the base address B, then the corrected address Sc is selected for output as NEXT_A.

Although modulo addressing circuit 200 implements equation (8) using three adders, similar to the three adders required by modulo addressing circuit 100, the adders of module addressing circuit 200 are not serially connected and a critical path is not formed. Therefore, even with the addition of comparator 24 to determine whether the incremented address Sa ranges between the base address B and the maximum address M, since low-speed adders are used for adders 21 and 22 and adder/subtracter 23 to implement equation (8), modulo addressing circuit 200 can be advantageous in terms of the circuit area required to implement the circuit and still achieve performance speeds that are suitable for application to highspeed digital signal processing.

As illustrated above, the modulo address generator and method according to the present invention has a reduced delay time for the addition operation without using high speed adders and can obtain favorable performance with less integrated circuit chip area required to implement as compared to modulo address circuits using high speed adders.

While a specific embodiment of the present invention has been disclosed in the drawings and specification, this embodiment is used in a generic and descriptive sense only and not for purposes of limitation, the scope of the invention being set forth in the following claims.

What is claimed:

1. A modulo address generator comprising:

a first adder configured to receive a current address value and an address increment value and add the current address value and the address increment value to generate an incremented address value;

an inverter configured to receive a maximum address value of a data region and generate a complemented maximum address value;

a second adder configured to receive the complemented maximum address value and a minimum address value of the data region and add the complemented maximum address value and the minimum address value to generate a circular correction value;

an adder/subtracter configured to receive the incremented address value, the circular correction value and a sign bit of the address increment value, wherein the adder/subtracter is further configured to add the incremented address value and the circular correction value responsive to a positive value of the sign bit and subtract the circular correction value from the incremented address value responsive to a negative value of the sign bit in order to generate a corrected address value;

a comparator configured to receive the incremented address value, determine whether the incremented address value is within an address range defined by the maximum and minimum addresses, and generate a selection signal having a first logic value when the incremented address value is within the address range and a second logic value when the incremented address value is outside the address range; and a multiplexor configured to receive the incremented address value, the corrected address value and the selection signal, wherein the multiplexor is further configured to select the incremented address value for output as a next address responsive to the first logic value of the selection signal and select the corrected address value for output as the next address responsive to the second logic value of the selection signal.

2. The modulo address generator of claim 1, wherein the first and second adders are low-speed adders.

3. The modulo address generator of claim 1, wherein the adder/subtracter is a low-speed adder/subtracter.

4. A modulo address generating method comprising the steps of:

generating an incremented address value by adding a current address to an address increment;

generating a circular correction value by adding a complement of a maximum address of a data region to a minimum address of the data region;

generating a corrected address value by subtracting the circular correction value from the incremented address value when a sign bit of the address increment is a first logic level and adding the circular correction value to the incremented address value when the sign bit is a second logic level;

comparing the incremented address value to an address range defined by the maximum address and minimum address to generate a selection signal; and selecting the incremented address value as a next address value when the incremented address value is within the address range and selecting the corrected address value as the next address value when the incremented address is outside the address range.

* * * * *